United States Patent
Singh et al.

(10) Patent No.: US 7,867,460 B2
(45) Date of Patent: Jan. 11, 2011

(54) EFFICIENCY OF AMMONIA PROCESSES

(75) Inventors: Shashi P. Singh, Missouri City, TX (US); Yue Jing, Sugar Land, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 371 days.

(21) Appl. No.: 12/107,506

(22) Filed: Apr. 22, 2008

(65) Prior Publication Data
US 2009/0136391 A1    May 28, 2009

Related U.S. Application Data

(60) Provisional application No. 60/990,207, filed on Nov. 26, 2007.

(51) Int. Cl.
*B01J 8/00* (2006.01)
*B01J 10/00* (2006.01)
*B01J 8/04* (2006.01)
*C01C 1/00* (2006.01)
*F28D 7/00* (2006.01)

(52) U.S. Cl. .................. 422/638; 422/148; 422/187; 422/630; 422/650; 422/651; 422/200; 422/201

(58) Field of Classification Search .............. 422/200, 422/148, 191, 197, 196, 189, 187, 201, 206, 422/202; 564/66, 67, 70–72
See application file for complete search history.

(56) References Cited

U.S. PATENT DOCUMENTS

| | | | | |
|---|---|---|---|---|
| 3,469,624 | A | * | 9/1969 | Koppe .................. 165/104.32 |
| 4,230,680 | A | * | 10/1980 | Becker et al. .............. 423/360 |
| 4,482,523 | A |  | 11/1984 | Peterson |
| 4,735,780 | A |  | 4/1988 | Noe |
| 4,755,362 | A | * | 7/1988 | Zardi ......................... 422/148 |
| 5,254,316 | A | * | 10/1993 | Zardi et al. ................. 422/148 |
| 6,482,382 | B1 |  | 11/2002 | Gam et al. |

FOREIGN PATENT DOCUMENTS

WO    WO 2006/010565 A1 *    2/2006

* cited by examiner

*Primary Examiner*—Walter D Griffin
*Assistant Examiner*—Natasha Young
(74) *Attorney, Agent, or Firm*—KBR IP Legal Dept.

(57) ABSTRACT

Systems and methods for producing ammonia. The system can include a first shell having two or more discrete catalyst beds disposed therein, a second shell disposed about the first shell, a first heat exchanger disposed external to the first shell and in fluid communication therewith, a second heat exchanger disposed external to the second shell and in fluid communication therewith, and a flow path disposed within the first shell. A first portion can be reacted in the presence of the catalyst to provide an ammonia effluent. The heat of reaction from the ammonia effluent can be exchanged within the first heat exchanger and the second heat exchanger. The heated second portion of the feed gas can be introduced to the first shell and can be reacted in the presence of the catalyst.

20 Claims, 3 Drawing Sheets

1

EFFICIENCY OF AMMONIA PROCESSES

CROSS-REFERENCE TO RELATED APPLICATION

This application claims benefit of U.S. Provisional Patent Application having Ser. No. 60/990,207 filed on Nov. 26, 2007, which is incorporated by reference herein.

BACKGROUND

1. Field

The present embodiments generally relate to the synthesis of ammonia. More particularly, embodiments of the present invention relate to recovering heat from an ammonia converter effluent to produce steam therefrom.

2. Description of the Related Art

Ammonia is commonly produced from syngas by reacting hydrogen and nitrogen in the presence of a catalyst in what is commonly referred to as an ammonia converter. An ideal syngas for ammonia synthesis will have a molar ratio of 3 moles hydrogen to 1 mole of nitrogen. The conversion of the syngas provides an ammonia rich effluent which contains ammonia and unreacted hydrogen and nitrogen.

The synthesis of ammonia is driven by an exothermic, catalytic reaction that generates heat. The temperature of the ammonia effluent is typically about 315° C. to about 340° C., which is suitable for pre-heating boiler feed water, but not for generating valuable steam. As such, traditional ammonia plants are inherently energy inefficient.

A need, therefore, exists for more efficient systems and methods for utilizing heat generated in the synthesis of ammonia.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Systems and methods for producing ammonia are provided. In at least one specific embodiment, a feed gas containing nitrogen and hydrogen can be apportioned to an ammonia converter. The ammonia converter can include a first shell having two or more discrete catalyst beds disposed therein, a second shell disposed about the first shell, a first heat exchanger disposed external to the first shell and in fluid communication therewith, a second heat exchanger disposed external to the second shell and in fluid communication therewith, and a flow path disposed within the first shell. The two or more discrete catalyst beds within the first shell can be disposed about the flow path. A first portion of the feed gas can be introduced to the first shell and a second portion of the feed gas can be introduced to the second shell. A first portion of the feed gas can be reacted in the presence of the catalyst to provide an ammonia effluent. At least a portion of the heat of reaction from the ammonia effluent can be exchanged to produce steam within the first heat exchanger. At least a portion of the heat of reaction from the ammonia effluent can be exchanged to the second portion of the feed gas within the second heat exchanger. The heated second portion of the feed gas can be introduced to the first shell. The heated second portion of the feed gas can be reacted in the presence of the catalyst.

Figure 1:
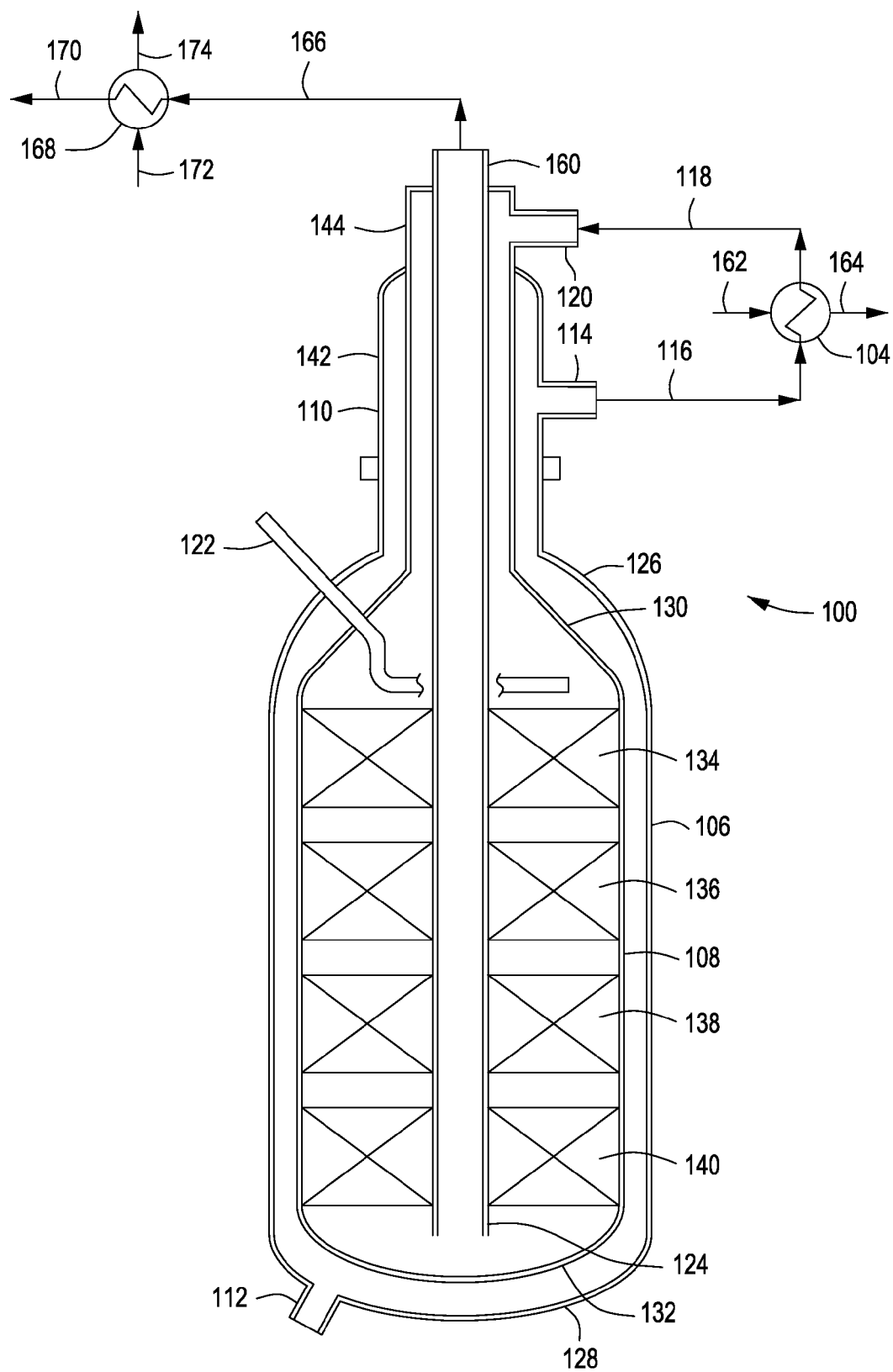
FIG. 1 depicts a partial cross-sectional view of an illustrative ammonia conversion system, according to one or more embodiments described.

FIG. 1 depicts a partial cross-sectional view of an illustrative ammonia conversion system, according to one or more embodiments. In one or more embodiments, the ammonia conversion system can include one or more reactors or ammonia converters 100, and two or more external heat exchangers (two are shown 104, 168) in fluid communication therewith. Each reactor 100 can include a first shell or first contained volume 108, a second shell or second contained volume 106, a cap 110, one or more connections or nozzles (four are shown 112, 114, 120, 160), and one or more conduits or flow paths (two are shown 122, 124). The outer shell ("converter shell") 106 can include a first end or head 126 and a second end or head 128. The inner shell ("basket") 108 can include a first end or head 130, a second end or head 132, and one or more discrete catalyst beds (four are shown 134, 136, 138, 140) disposed within the inner shell 108.

The cap 110 can include an outer shell 142, which can connect to the first end 126 of the outer shell 106. The cap 110 can also include an inner shell 144 which can connect to the first end 130 of the inner shell 108. A portion of the conduit or flow path 124 can be disposed within or through the cap 110. The conduit or flow path 124 can be in fluid communication with the connection ("outlet") 160 disposed on the cap 110.

The first heat exchanger 168 can be in fluid communication with the first shell 108 via the flow path 124. The first heat exchanger 168 can be or include any system or device suitable for indirectly transferring heat from one fluid to another fluid. For example, the first heat exchanger 168 can be or include one or more shell-and-tube, plate and frame, spiral wound, U-tube, and/or bayonet style heat exchangers. In one or more embodiments, an ammonia effluent via line 166 can be introduced to the first heat exchanger 168 and recovered via line 170. In one or more embodiments, a heat transfer medium can be introduced via line 172 to the first heat exchanger 168 and recovered via line 174. The heat transfer medium can be or include condensate, boiler feed water ("BFW"), low pressure ("LP") steam, and/or medium pressure ("MP") steam. Steam can be recovered via line 174 from the first heat exchanger 168.

In one or more embodiments, the ammonia effluent in line 166 can be at a temperature sufficient to generate high pressure steam. The high pressure steam can be at a pressure of from about 10,300 kPa to about 12,500 kPa. In one or more embodiments, the ammonia effluent in line 166 can be at a temperature sufficient to generate superheated MP steam. In one or more embodiments, the ammonia effluent can be at a temperature of about 350° C. or more. In one or more embodiments, the ammonia effluent can range from a low temperature of about 430° C., about 440° C., or about 445° C. to a high of about 460° C., about 465° C., or about 470° C. For example, the ammonia effluent can be at a temperature of from about 450° C. to about 455° C. or more.

The cooled ammonia effluent can be recovered via line 170 from the first heat exchanger 168. In one or more embodiments, the ammonia effluent can be cooled to a temperature of less than 400° C., less than 395° C., or less than 390° C. In one or more embodiments, the ammonia effluent can be cooled to a temperature of from about 335° C. to about 385° C., from about 335° C. to about 370° C., or from about 380° C. to about 385° C.

In one or more embodiments, a fluid ("feed gas") can be introduced to the ammonia reactor 100. The feed gas can include hydrogen ($H_2$) and nitrogen ($N_2$). The feed gas can be apportioned into two or more portions. For example, the feed gas can be apportioned into a first portion and a second portion. The first portion can be introduced via the one or more conduits ("inlets") 122. In one or more embodiments, the first portion introduced via inlets 122 can range from a low of about 30% vol, about 35% vol, or about 40% vol to a high of about 50% vol, about 55% vol, or about 60% vol of the incoming feed gas. For example, the first portion introduced via inlets 122 can be from about 40% vol to about 52% vol, about 38% vol to about 54% vol, or about 36% vol to about 56% vol of the incoming feed gas. The second portion can be introduced via connection ("inlet") 112. In one or more embodiments, the second portion introduced via inlet 112 can range from a low of about 40% vol, about 45% vol, or about 50% vol to a high of about 60% vol, about 65% vol, or about 70% vol of the incoming feed gas. For example, the second portion introduced via inlet 112 can be from about 48% vol to about 60% vol, about 46% vol to about 62% vol, or about 44% vol to about 64% vol of the incoming feed gas.

In one or more embodiments, the second portion can be introduced via inlet 112 and can flow between the outer shell 106 and the inner shell 108 to the connection or outlet 114. The first shell 108 can define an annulus between the first shell 108 and the second shell 106 through which the second portion can flow through. In one or more embodiments, the second portion can cool or otherwise regulate the temperature of the outer shell 106. For example, the second portion can regulate the outer shell 106 at a temperature ranging from a low of about 120° C., about 125° C., or about 130° C. to a high of about 150° C., about 155° C., or about 160° C. Regulating the outer shell 106 at a temperature of less than about 160° C. can allow the outer shell 108 to be constructed from lower cost materials, such as carbon steel.

The second heat exchanger 104 can be in fluid communication with the first shell 108 and the second shell 106, via lines 118 and 116, respectively. The second heat exchanger 104 can be or include any system or device suitable for indirectly transferring heat from one fluid to another fluid. For example, the second heat exchanger 104 can be or include one or more shell-and-tube, plate and frame, spiral wound, U-tube, and/or bayonet style heat exchangers. In one or more embodiments, the second portion can be introduced via line 116 to the second external heat exchanger 104. Heat can be indirectly transferred to the second portion via a heat transfer medium introduced to the heat exchanger 104 via line 162 to provide a heated second portion via line 118. In one or more embodiments, the heat transfer medium can be, but is not limited to, at least a portion of a downstream ammonia effluent from the reactor 100. The heat transfer medium introduced via line 162 to the heat exchanger 104 can be recovered via line 164.

In one or more embodiments, the heated second portion in line 118 can be introduced to the first shell 108 via connection ("inlet") 120. The heated second portion can flow through the annulus defined by the flow path 124 and the inner shell 144 of the cap 110 to the one or more catalyst beds 134, 136, 138, 140 disposed within the first shell 108. At least a portion of the heated second portion, e.g. hydrogen and nitrogen, can be converted to provide an ammonia effluent. The second portion can be converted or reacted in the presence of the one or more catalysts disposed within the catalyst beds 134, 136, 138, 140 to provide an ammonia effluent. After flowing through the one or more catalyst beds 134, 136, 138, 140 the ammonia effluent can be recovered via flow path 124.

In one or more embodiments, the first portion can be introduced to the one or more catalyst beds 134, 136, 138, 140 disposed within the inner shell 108. The first portion can be distributed to two or more of the catalyst beds 134, 136, 138, 140 via a single conduit 122 or multiple conduits (not shown). The first portion can be apportioned equally or unequally to two or more of the catalyst beds 134, 136, 138, 140

In one or more embodiments, the first portion can act as a temperature regulator which can reduce or maintain the catalyst beds 134, 136, 138, 140 at a desired reaction temperature. The flow rate of the first portion introduced to any particular catalyst bed can be manually or automatically adjusted to correspond to an optimal flow rate for that particular catalyst bed. In one or more embodiments, the heated second portion and the first portion can be mixed or otherwise combined within the catalyst beds 134, 136, 138, 140 as the first and second portion flow through the catalyst beds to provide the ammonia effluent. In one or more embodiments, the heated second portion and the first portion can indirectly exchange heat via one or more internal heat exchangers (not shown) within the reactor 100. The first portion and second portion can then be mixed or otherwise combined within the one or more catalyst beds. The ammonia effluent can be recovered from the inner shell 108 via the flow path 124.

In one or more embodiments, the first portion can be introduced via line 122 to the first catalyst bed 134 at a temperature and/or rate sufficient to maintain the first catalyst bed 134 at a temperature ranging from a low of about 340° C., about 350° C., or about 360° C. to a high of about 380° C., about 390° C., or about 400° C. In one or more embodiments, the first portion can be introduced via line 122 to the second catalyst bed 136 at a temperature and/or rate sufficient to maintain the second catalyst bed 136 at a temperature ranging from a low of about 350° C., about 360° C., or about 370° C. to a high of about 390° C., about 400° C., or about 410° C. In one or more embodiments, the first portion can be introduced via line 122 to the third catalyst bed 138 at a temperature and/or rate sufficient to maintain the third catalyst bed 138 at a temperature ranging from a low of about 360° C., about 370° C., about 380° C. to a high of about 400° C., about 410° C., or about 420° C. In one or more embodiments, the first portion can be introduced via line 122 to the fourth catalyst bed 140 at a temperature and/or rate sufficient to maintain the third catalyst bed 140 at a temperature ranging from a low of about 370° C., about 380° C., or about 390° C. to a high of about 400° C., about 410° C., or about 420° C.

In one or more embodiments, the first shell or first contained volume 108 and the second shell or second contained volume 106 can be concentric with one another. In one or more embodiments, the first shell or first contained volume 108, the second shell or the second contained volume 106, and the flow path 124 can be concentric with one another. The first shell or first contained volume 108 and the second shell or second contained volume 106 can include a first section and a second section. The first section can have a cross section larger than the cross section of the second section. For example, the outer shell 142 of the cap 110 can have a smaller cross section than the outer shell 108. The inner shell 144 of the cap 110 can have a smaller cross section than the inner shell 106.

In one or more embodiments, the one or more catalyst beds 134, 136, 138, 140 can be, but are not limited to, axial beds, axial/radial beds, radial beds, or any combination thereof. In one or more embodiments, the one or more catalyst beds 134, 136, 138, 140 can be cold gas quenched, inter-cooled using one or more exchangers, or a combination thereof to control or otherwise regulate the temperature of the one or more catalyst beds. The catalyst disposed within the one or more catalyst beds 134, 136, 138, 140 can be or include a magnetite catalyst. The catalyst can be or include a noble metal catalyst, for example, a catalyst based upon ruthenium, such as the ruthenium-based KAAP catalyst available from Kellogg, Brown and Root. Each catalyst bed 134, 136, 138, 140 can include the same catalyst or different catalyst. Each catalyst bed 134, 136, 138, 140 can contain two or more different catalysts.

The energy efficiency of an ammonia process can be influenced by various factors, such as an additional second ammonia converter, and other plant specific parameters, such as the upstream or front-end design of the plant. Here, the energy efficiency of the ammonia plant's inside battery limits ("ISBL") can be improved by about 0.18 Gcal/MT to about 0.3 Gcal/MT. The second heat exchanger or interchanger 104 can heat the second portion downstream from the initial cooling of the ammonia effluent in the first heat exchanger or interchanger 168. Residual heat in the ammonia effluent after generating, for example high pressure steam, can be sufficient to preheat the second portion to a temperature sufficient for reacting within the one or more catalyst beds 124, 136, 138, 140 to provide the ammonia effluent via line 166. For example, the second portion can be heated to a temperature ranging from a low of from about 340.degree. C., about 350° C., or about 360° C. to a high of about 380° C., about 390° C., or about 400° C.

In one or more embodiments, an existing ammonia converter can be modified or retrofitted to provide the design configuration and improved efficiency discussed and described above. For example, the heat recovered from the ammonia effluent can be utilized to generate valuable high pressure steam and/or superheated medium pressure steam. An ammonia converter having a shell-and-tube heat exchanger or interchanger located in the upper cap of the converter can be retrofitted according to one or more embodiments described. An ammonia converter with a heat exchanger, i.e. shell-and-tube, disposed within the cap 110 limits the amount of heat recovered from the process. Therefore, the temperature of the ammonia effluent recovered via line 166 is insufficient to provide high pressure steam. For example, in a configuration having a shell-and-tube heat exchanger or interchanger disposed within the cap 110 the temperature of the ammonia effluent exiting the ammonia converter 100 will typically be about 315° C. to about 340° C., which is insufficient for producing high pressure steam and/or superheated medium pressure steam. The process heat generated within the ammonia converter will normally be used to pre-heat BFW or generate medium pressure steam, which is less desirable and less valuable than high pressure steam.

In one or more embodiments, the cap from an existing ammonia converter can be removed and replaced with a new or modified cap to correspond to the redesigned cap 110 discussed and described above, which provides the flow path for the second portion to an external heat exchanger rather than the internal heat exchanger within the cap 110. An existing ammonia converter 100 modified to include the cap 110 as discussed and described above can be capable of handling the pressure drop that can be exerted within the ammonia converter as currently designed. Therefore, the modification can be performed by removing and either discarding or modifying the old cap. The old internal shell-and-tube heat exchanger can be removed and discarded and a new or modified cap 110 can be constructed. The outlets 114, 160 and inlets 112, 120, 122 can be sized based upon the particular process conditions. The outlet 160 can be in fluid communication with the flow path 124 disposed through or otherwise around the catalyst beds 134, 136, 138, 140. The inner shell 144 of the cap 110 can be connected to the inner shell 108 of the ammonia converter 100 and the outer shell 142 of the cap can be connected with the outer shell 106 of the ammonia converter 100.

Figure 2:
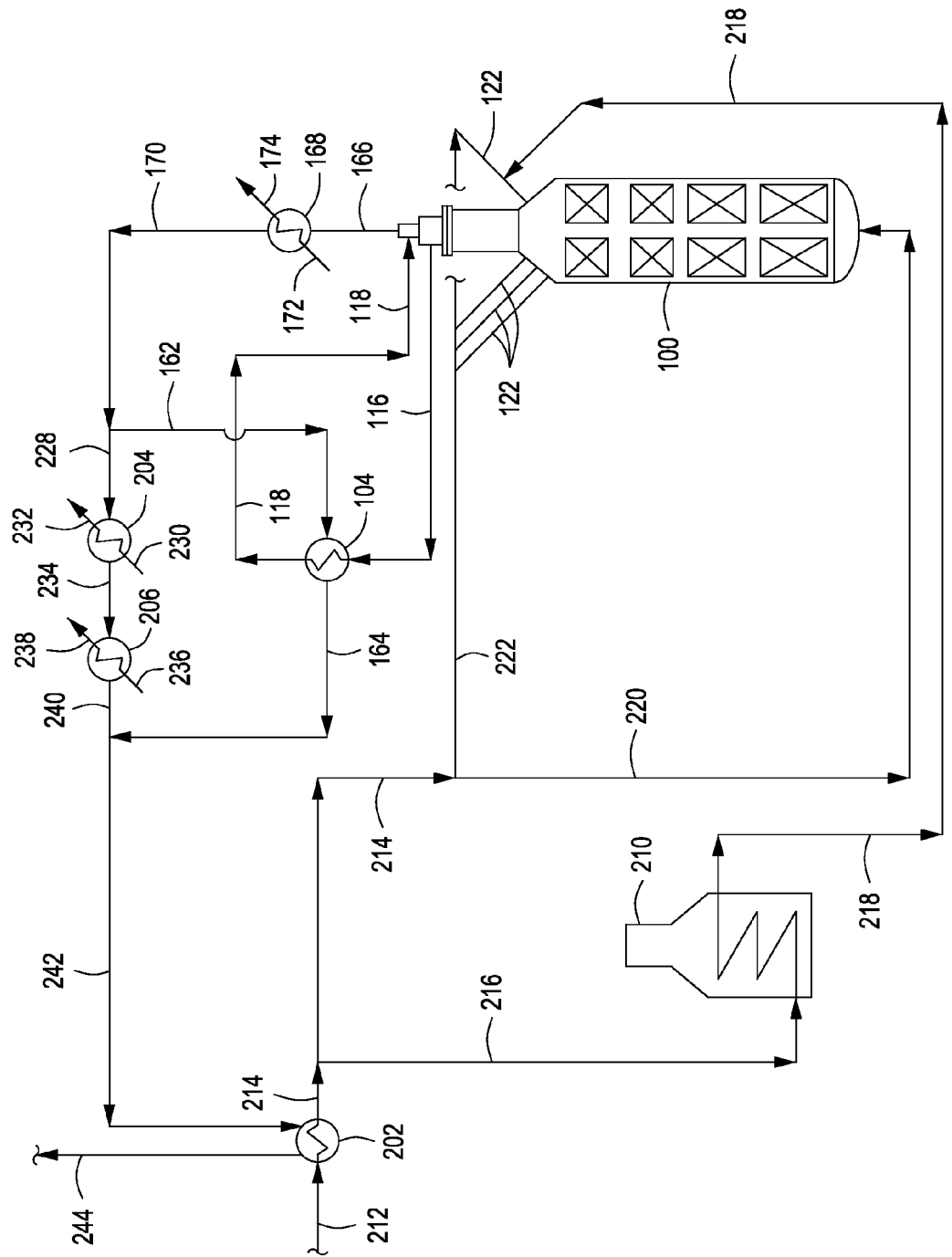
FIG. 2 depicts a schematic of an illustrative system for producing ammonia, according to one or more embodiments described.

FIG. 2 depicts a schematic of an illustrative system for producing ammonia, according to one or more embodiments. In one or more embodiments, the system can include an ammonia converter 100 and one or more heat exchangers (five are shown 104, 168, 202, 204, 206). The system can further include one or more start-up heaters 210. In one or more embodiments, the ammonia converter 100 and heat exchangers 104 and 168 can be the same as discussed and described above with reference to FIG. 1.

In one or more embodiments, the feed gas, which can be the same as discussed and described above with reference to FIG. 1, via line 212 can be introduced to a pre-heater or heat exchanger 202 to provide a pre-heated feed. The pre-heated feed gas can be recovered via line 214. In one or more embodiments, the pre-heated feed gas in line 214 can be at a temperature ranging from a low of about 120° C., about 125° C., or about 130° C. to a high of about 150° C., about 155° C., or about 160° C. For example, the pre-heated feed gas in line 214 can be at a temperature of about 141° C. In one or more embodiments, the pre-heated feed gas in line 214 can be at a pressure ranging from a low of about 12,500 kPa, about 13,000 kPa, or about 13,500 kPa to a high of about 18,500 kPa, about 19,000 kPa, or about 19,500 kPa. During plant start-up at least a portion of the feed gas via line 216 can be introduced to one or more start-up heaters 210 to provide a pre-heated feed gas via line 218 at a temperature sufficient to initiate start-up of the ammonia converter 100. The pre-heated feed gas in line 218 can be introduced via line 122 to the inner shell 108 disposed within the outer shell 106 (see FIG. 1).

In one or more embodiments, the pre-heater 210 can be or include any device suitable for heating at least a portion of the feed gas to a suitable temperature to begin start-up of the ammonia converter 100. The pre-heater can be, for example, a fired furnace or heater. In one or more embodiments, the pre-heated feed gas in line 218 can be heated to a low temperature of about 300° C., about 330° C., or about 360° C. to a high temperature of about 380° C., 400° C., or about 420° C.

In one or more embodiments, during normal operation the feed gas in line 214 can bypass the pre-heater 210. The feed gas in line 214 can be apportioned into a first portion via line 222 and a second portion via line 220. The second portion can be introduced to the annulus disposed between the inner shell 108 and the outer shell 106 (see FIG. 1) of the ammonia converter 100. The first portion in line 222 can be introduced to the inner shell 108 via one or more lines 122 (four are shown).

The ammonia effluent recovered via line 166 can be indirectly cooled in heat exchanger 168 using a heat transfer medium as discussed and described above in reference to FIG. 1. The heat transfer medium, e.g. BFW, can be introduced via line 172 and high pressure steam can be recovered via line 174. The ammonia effluent can be recovered via line 170.

In one or more embodiments, the ammonia effluent for an 1,100 MTPD plant can be at a temperature greater than 350° C., for example about 450° C. to about 455° C. and a pressure of about 14,600 kPa. The heat duty for an 1,100 MTPD plant, which can be indirectly transferred from the ammonia effluent to the boiler feed water in the heat exchanger 168, can be about 14.5 Gcal/hr. The high pressure steam can be at a pressure of from about 10,300 kPa to about 12,500 kPa. The cooled ammonia effluent can be recovered from the heat exchanger 168 via line 170. The ammonia effluent can be cooled to a temperature of from about 335° C. to about 385° C., from about 335° C. to about 370° C., or from about 380° C. to about 385° C.

In one or more embodiments, the recovered ammonia effluent in line 166 can be apportioned into a first portion via line 162 and a second portion via line 228. In one or more embodiments, the first portion of the ammonia effluent in line 162 can range from a low of about 35% vol, about 40% vol, or about 45% vol to a high of about 50% vol, about 55% vol, or about 60% vol of the total ammonia effluent in line 170. In one or more embodiments, the second portion of the ammonia effluent in line 228 can be the balance of the total ammonia effluent in line 170.

In one or more embodiments, the first portion of the ammonia effluent via line 162 can be introduced to the heat exchanger 104 wherein heat can be indirectly transferred from the first portion of the ammonia effluent to the second portion of the feed gas introduced via line 116 to provide a preheated second portion via line 118. The preheated second portion via line 118 can be introduced to the one or more catalyst beds 134, 136, 138, 140 within the inner shell 108 as discussed and described above with reference to FIG. 1. The first portion of the ammonia effluent introduced via line 162 to heat exchanger 104 can be recovered via line 164.

In one or more embodiments, the second portion of the ammonia effluent via line 228 can be introduced to heat exchanger 204. Heat can be indirectly exchanged from the second portion of the ammonia effluent to a heat transfer medium, e.g. BFW, introduced via line 230 to provide steam via line 232. The steam provided in line 232 can be low pressure steam, medium pressure steam, superheated medium pressure steam, or high pressure steam. The second portion of the ammonia effluent can be recovered via line 234. For example, a 1,100 MTPD plant can recover about 4.6 Gcal/hr heat duty from the second portion of the ammonia effluent. In one or more embodiments, the heat duty recovered can vary depending on the plant size and capacity.

In one or more embodiments, about 60% of the process waste heat available from the ammonia effluent can be recovered as high pressure steam via lines 174 and 232. In one or more embodiments, the process waste heat recovered from the ammonia effluent used to provide high pressure steam and/or superheated medium pressure steam can range from a low of about 10%, about 20%, about 30%, or about 40%, to a high of about 50%, about 60%, about 65%, or about 70%. In one or more embodiments, the remaining waste heat can be utilized for preheating BFW or for generating lower grades of steam, such as low pressure steam and medium pressure steam.

The second portion of the ammonia effluent in line 234 can be introduced to heat exchanger 206. Heat can be transferred from the second portion of the ammonia effluent to a heat transfer medium, e.g. BFW, introduced via line 236 in the heat exchanger 206. The heat exchanger 206 can pre-heat the BFW, which can be recovered via line 238. The second portion of the ammonia effluent can be recovered from the BFW pre-heater 206 via line 240.

In one or more embodiments, the first portion of the ammonia effluent via line 164 can be mixed with the second portion of the ammonia effluent in line 240 to provide a mixed or otherwise recombined ammonia effluent in line 242. The ammonia effluent in line 242 can be introduced to the pre-heater 202. Heat from the ammonia effluent can be indirectly transferred to the feed gas introduced via line 212 to the pre-heater 202.

In one or more embodiments, a cooled ammonia effluent can be recovered from the pre-heater 202 via line 244 and further processed downstream. The cooled ammonia effluent in line 244 can be separated to provide an ammonia product and the recycle feed. In one or more embodiments, the cooled ammonia effluent in line 244 can be further cooled prior to separation into the ammonia product and the recycle feed. Although not shown, the recycle feed gas can be recycled to line 212, which can be introduced to the ammonia converter 100 for conversion to ammonia in addition to make-up feed gas. The make-up syngas can be fresh syngas or other hydrogen and nitrogen containing feed gas suitable for the synthesis of ammonia.

In one or more embodiments, the heat exchangers 202, 204, and 206 can be or include any system or device suitable for indirectly transferring heat from one fluid to another fluid. For example, the heat exchangers can be or include one or more shell-and-tube, plate and frame, spiral wound, U-tube, and/or bayonet style heat exchangers. The heat exchangers can be sized and fabricated according to plant process specifications.

Figure 3:
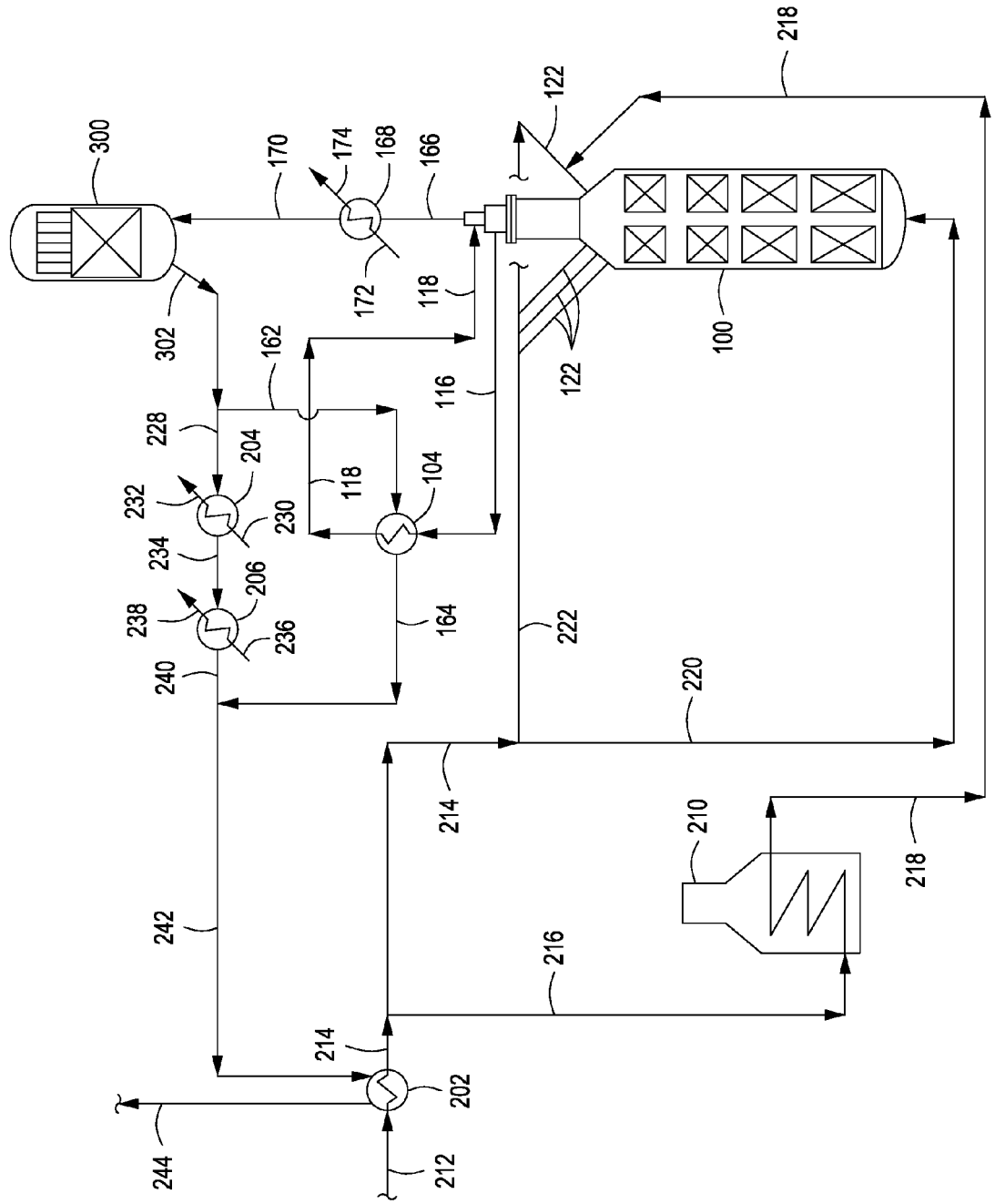
FIG. 3 depicts a schematic of another illustrative system for producing ammonia, according to one or more embodiments described.

FIG. 3 depicts a schematic of another illustrative system for producing ammonia, according to one or more embodiments described. In one or more embodiments, the system for producing ammonia can be the same as discussed and described above with reference to FIGS. 1 and 2. The system for producing ammonia can include one or more secondary ammonia converters 300. In one or more embodiments, the recovered ammonia effluent via line 170 can be introduced to one or more secondary ammonia converters 300 (one is shown). The secondary ammonia converter 300 can convert unreacted hydrogen and nitrogen in the recovered ammonia effluent to provide additional ammonia.

The temperature of the ammonia effluent introduced via line 170 to the secondary ammonia converter 300 can depend upon the particular design of the secondary ammonia converter 300. The temperature of the ammonia effluent introduced via line 170 to the secondary ammonia converter 300 can be adjusted or controlled by cooling the ammonia effluent in the first heat exchanger 168 to a suitable temperature. For example, the ammonia effluent can be introduced via line 170 to the secondary ammonia converter 300 at a temperature ranging from a low of about 315° C., about 325° C., or about 335° C. to high of about 365° C., about 370° C., or about 375° C.

In one or more embodiments, the ammonia effluent introduced to the one or more secondary ammonia converters 300 can be recovered via line 302. The ammonia effluent in line 302 can be apportioned into a first portion via line 162 and a second portion via line 228. In one or more embodiments, the first portion of the ammonia effluent in line 162 can range from a low of about 35% vol, about 40% vol, or about 45% vol to a high of about 50% vol, about 55% vol, or about 60% vol of the total ammonia effluent in line 170. In one or more embodiments, the second portion of the ammonia effluent in line 228 can be the balance of the total ammonia effluent in line 170.

In one or more embodiments, the first portion of the ammonia effluent via line 162 can be used to heat the second portion of the feed gas in line 116, as discussed and described above in reference to FIGS. 1 and 2. In one or more embodiments, the second portion of the ammonia effluent in line 228 can be used to provide high pressure steam in line 232 and pre-heated BFW in line 238 as discussed and described above with reference to FIG. 2. The first portion of the ammonia effluent via line 164 can be introduced to the second portion of the ammonia effluent in line 240 to provide the combined or otherwise mixed ammonia effluent in line 242. The ammonia effluent in line 242 can be introduced to the feed gas pre-heater 202 to provide the pre-heated feed gas in line 214 and the cooled ammonia effluent in line 244.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A system for producing ammonia, comprising:
   a reactor comprising:
      a first shell having two or more discrete catalyst beds disposed therein;
      a second shell disposed about the first shell; and
      a first flow path disposed within the first shell, wherein the two or more discrete catalyst beds within the first shell are disposed about the first flow path;
   a first heat exchanger disposed external to the reactor and in fluid communication with the first shell; and
   a second heat exchanger disposed external to the reactor and in fluid communication with the first shell and the second shell, wherein a second flow path fluidly connects the second shell to the second heat exchanger and a third flow path fluidly connects the second heat exchanger to the first shell such that a fluid from the second shell flows through the second flow path, into the second heat exchanger, and through the third flow path into the first shell.

2. The system of claim 1, wherein the first and second shells are concentric with one another.

3. The system of claim 1, wherein the first shell, the second shell, and the first flow path are concentric with one another.

4. The system of claim 1, wherein the first shell and the second shell each comprise a first section and second section, wherein the first section has a cross section larger than a cross section of the second section.

5. A system for producing ammonia, comprising:
   a first contained volume disposed within a second contained volume;
   two or more discrete catalyst beds disposed within the first contained volume;
   a first flow path at least partially disposed within the first contained volume and through the two or more discrete catalyst beds;
   a first heat exchanger disposed external to the first and second contained volumes;
   a second heat exchanger disposed external to the first and second contained volumes, wherein:
      the first flow path is in fluid communication with the first contained volume at a first end thereof and in fluid communication with the first heat exchanger at a second end thereof,
      a second flow path is in fluid communication with the second heat exchanger at a first end thereof and in fluid communication with the second contained volume at a second end thereof, and
      a third flow path is in fluid communication with the second heat exchanger at a first end thereof and in fluid communication with the first contained volume at a second end thereof such that a fluid from the second contained volume flows through the second flow path, through the second heat exchanger, and through the third flow path into the first contained volume.

6. The system of claim 5, wherein the first contained volume and the second contained volume are concentric with one another.

7. The system of claim 5, wherein the first contained volume, the second contained volume, and the first flow path are concentric with one another.

8. The system of claim 5, wherein the first contained volume and the second contained volume each comprise a first section and second section, wherein the first section has a cross section larger than a cross section of the second section.

9. A method for producing ammonia, comprising:
   apportioning a feed gas comprising nitrogen and hydrogen to an ammonia converter, the converter comprising:
      a first shell having two or more discrete catalyst beds disposed therein;
      a second shell disposed about the first shell;
      a first heat exchanger disposed external to the first shell and in fluid communication therewith;
      a second heat exchanger disposed external to the second shell and in fluid communication therewith; and
      a flow path disposed within the first shell, wherein the two or more discrete catalyst beds within the first shell are disposed about the flow path, wherein a first portion of the feed gas is introduced to the first shell and a second portion of the feed gas is introduced to the second shell;

reacting the first portion of the feed gas in the presence of the catalyst to provide an ammonia effluent;

exchanging at least a portion of the heat of reaction from the ammonia effluent to produce steam within the first heat exchanger;

exchanging at least a portion of the heat of reaction from the ammonia effluent to the second portion of the feed gas within the second heat exchanger;

introducing the heated second portion of the feed gas to the first shell; and reacting the heated second portion of the feed gas in the presence of the catalyst.

10. The method of claim 9, wherein the steam is at a pressure of from about 10,300 kPa to about 12,500 kPa.

11. The method of claim 9, wherein the ammonia effluent is at a temperature of from about 440° C. to about 465° C.

12. The method of claim 9, wherein the ammonia effluent is at a pressure of about 13,500 kPa to about 19,000 kPa.

13. The method of claim 9, wherein the ammonia effluent is cooled in the second heat exchanger to a temperature of from about 335° C. to about 385° C.

14. The method of claim 9, wherein the first portion comprises from about 40% vol to about 52% vol of the feed gas.

15. The method of claim 9, wherein the second portion within the second shell is at a temperature of about 120° C. to about 160° C.

16. The method of claim 9, wherein the catalyst comprises magnetite, one or more platinum-group metals, derivatives thereof, or combinations thereof.

17. The method of claim 9, wherein about 45% vol to about 55% vol of the ammonia effluent is used to heat the second portion of the feed gas.

18. A method for retrofitting a system for producing ammonia, the system comprising an ammonia converter having an internal interchanger for heating an ammonia feed gas and a first external interchanger for transferring heat from an ammonia product to a waste process stream, the method comprising:

removing the internal interchanger from the converter and modifying the ammonia converter such that the heat transferred from the ammonia product to the waste process stream in the first external interchanger produces high pressure steam; and redirecting the ammonia feed gas to a second external interchanger where heat is transferred from the ammonia product to the ammonia feed gas to produce a heated ammonia feed gas, and the heated ammonia feed gas is introduced to the ammonia converter.

19. The method of claim 18, wherein the high pressure steam is at a pressure of from about 10,300 kPa to about 12,500 kPa.

20. The method of claim 18, wherein the ammonia product is at a temperature of about 440° C. to about 465° C. when heat is transferred from the ammonia product to the waste process stream.

* * * * *